United States Patent [19]

Elliott et al.

[11] 4,152,586
[45] May 1, 1979

[54] OPTICAL TRANSDUCER AND FOCUSING SYSTEM

[75] Inventors: James E. Elliott, San Pedro; Lee Mickelson, Long Beach, both of Calif.

[73] Assignee: MCA Discovision, Inc., Universal City, Calif.

[21] Appl. No.: 909,860

[22] Filed: May 26, 1978

Related U.S. Application Data

[63] Continuation-in-part of Ser. No. 803,986, Jun. 6, 1977, abandoned.

[51] Int. Cl.² .............................................. G01J 1/20
[52] U.S. Cl. .................................. 250/201; 250/204; 179/100.3 V
[58] Field of Search ............... 358/128; 179/100.3 V, 179/100.3 G; 250/201, 204

[56] References Cited

U.S. PATENT DOCUMENTS

| | | | |
|---|---|---|---|
| 3,454,772 | 7/1969 | Vitt, Jr. | 250/204 |
| 3,596,101 | 7/1971 | Someya | 250/204 |
| 3,721,827 | 3/1973 | Reinheimer | 250/201 |
| 3,757,124 | 9/1973 | Kaestner | 250/201 |
| 3,876,841 | 4/1975 | Kramer | 250/201 |
| 3,890,499 | 6/1975 | Lippel | 250/201 |
| 3,974,327 | 8/1976 | Dijk | 250/201 |
| 3,997,715 | 12/1976 | Elliott | 250/201 |

OTHER PUBLICATIONS

I.B.M. Technical Disclosure Bulletin, A. Frosch, et al., vol. 15, No. 2, (Jul. 1972), at 504,505.

*Primary Examiner*—M. Tokar
*Attorney, Agent, or Firm*—Ronald J. Clark

[57] ABSTRACT

An optical transducer having concentric radiant beam detectors for converting a radiant beam to electrical signals including a first axially placed detector with a second detector concentric therewith. In one embodiment, the detectors receive the radiant beam through an amplifying auxiliary lens. Changes in focus differentially affect the magnitude of the beam impinging on the individual detectors, resulting in corresponding changes in the individual detector outputs.

A focusing system employing the transducer moves a focusing lens in response to the differential output of the individual detectors. The focusing system can be employed in a video disc reading system so that the video disc scanning beam is always focused precisely at the disc. An electrical difference circuit leading from the photo-detectors generates a driving signal to energize a lens-moving motor for shifting the focusing lens along the axis of the beam.

56 Claims, 10 Drawing Figures

OPTICAL TRANSDUCER AND FOCUSING SYSTEM

CROSS-REFERENCE TO RELATED APPLICATION

This application is a continuation-in-part of our co-pending application Ser. No. 803,986, filed June 6, 1977, entitled "OPTICAL FOCUSING SERVO-SYSTEM", now abandoned. The latter parent application is assigned to the same assignee as the present application.

BACKGROUND OF THE INVENTION

This invention relates generally to radiant beam focusing arrangements and, more particularly, to an optical transducer, and a focusing system that employs it, for positioning a focusing lens so as to maintain a radiant beam accurately focused at a desired moving surface.

In the prior art it has been known to use optical focusing systems for maneuvering a lens in a light beam path in response to signals detected by a photosensitive detector to position the lens for optimum focus. For example, one type of video disc player utilizes a disc rotated on a turntable, wherein the video disc is scanned by a light beam which is accurately focused by an objective lens onto the information tracks of the video disc surface. A reflected beam of light is returned from the information track through the objective lens and directed to a photocelltype detector system, where a plurality of detectors derive both control signals for controlling, among other things, the position of the lens and an information signal containing the video information stored in the information track. The information signal output from the detector system is used to create a display, for example on a cathode ray tube to provide a video screen output.

Typically, the light beam is focused on a micron wide information track of the video disc. This requires a capability for accurately focusing the light beam to a spot of about one micron in width on the video disc. It will be readily appreciated that slight variations in the distance between the objective lens and the video disc information track can cause a loss of information in the reflected beam and undesirable frequencies can be introduced in the resulting electrical signal.

Video discs are subject to surface imperfections which vary the distance between the objective lens that focuses the impinging light beam and the information track. Video discs made of plastic, for example, may have varying thicknesses which are unavoidable even in the most sophisticated of replication processes. In disc manufacturing, further, ripple patterns may develop and vertical eccentricities can result from mass manufacturing techniques. Warping from distribution, storage and manufacturing may vary the lens-to-surface distance, especially at the outer edges of the disc where the variations move passed the light beam at a more rapid rate.

Such variations, if known beforehand, can be accommodated by several techniques. The light source, for example, theoretically can be manipulated to re-establish focus, or the beam intermediate to the light source and the objective lens also can be manipulated, although neither of these approaches are very practical. The objective lens itself may be moved toward and away from the video disc along the path of the light. Such movement of the objective lens, however, requires precision apparatus sensing very miniscule spatial movements of the video disc. The lens servo apparatus, moreover, must be capable of determining the correct direction along the reflected light beam axis to insure correct spot focusing on the disc.

Servo-systems utilizing photocell-type detector systems for focusing have been known in the past. Such a system can be seen in the Application of James E. Elliott, Ser. No. 454,130 filed Mar. 25, 1974 and now U.S. Pat. No. 3,997,715, and assigned to the assignee of the present invention, and in the patent to Kramer, et al., U.S. Pat. No. 3,876,841. In these focusing systems, photosensitive focus detectors, separate from an information detector, are positioned in the path of the light beam or adjacent the information detector. Thus, focus control signals separate from the information signal are derived for operating a servo-system for re-establishing the precise focus. One drawback in these systems, however, is that light is prevented from reaching the information detector by the focus detectors in order to re-establish the correct focus.

The systems of the known prior art have met with varying degrees of success. Many systems depend upon mechanical moving parts between the objective lens and the information detector for providing differential signal detections capable of initiating servo mechanisms. Any such mechanical, interconnected device necessarily introduces delays which may materially affect the response time and other desired efficiencies in the movement of whatever element which will re-establish the desired focus. Also, many such focusing systems are very sensitive to tracking errors.

It has long been sought to have an optical focusing system for focusing a beam at a moving surface having slight variations therein, the system having minimal mechanically interconnected devices and no depletion of the reflected beam by focus detectors, which can result in loss of information. It is also desired to have an optical focusing systems having detectors of minimum size for packaging considerations, while retaining sufficient size for accurate readings. It is also desired to have a non-moving detector arrangement capable of microelectronic production in an optical focusing system arrangement.

It has also been a goal to have an improved optical transducer in a single integral unit which can provide all the necessary electrical signals from which the information content of the impinging light beam, as well as the information necessary to correct focus, can be obtained. Prior art systems have utilized detector arrays including several individual detectors arranged in predetermined patterns which are interconnected in various configurations to provide the necessary information.

SUMMARY OF INVENTION

Briefly, and in general terms, the present invention provides a new and improved optical transducer and focusing system for focusing a beam of radiation on a reflective surface, wherein the transducer detects focus by providing electrical signals indicative of the relative amounts of reflected radiation received on a first radiation sensitive surface and on a second radiation sensitive surface, at least a portion of which is disposed around the periphery of the first radiation-sensitive surface. An appropriate focusing element, such as an objective lens, is moved as a function of the difference between the signals to bring the radiant beam into focus on the surface. The transducers are positioned to receive all the reflected radiation, such that the electrical signals can be combined to derive any information contained in the reflected radiation, with only negligible depletion as a result of separation between the first and the second radiation-sensitive surfaces. In addition, the present invention provides means for compensating for the effects of variations in radiant beam intensity on the response to the focusing system, and further provides means for compensating for a nonlinear transducer response to provide a linear response by the focusing system to changes in focus.

Basically, the present invention includes a transducer employed in an optical system in which a source beam of radiation is directed through a lens for focusing on a reflective surface and a reflected beam is gathered by the lens for focusing at an image plane removed from the surface. The transducer is disposed in the path of the reflected beam, located on one side or other of the image plane formed when the source beam is focused on the surface. The transducer comprises a central photosensitive surface surrounded by, but insulated from an outer photosensitive surface. The transducer is positioned such that a portion of the reflected beam image formed on the transducer is received on each detector. Variations in focus affect the size of the reflected beam image and results in a differential change in the relative radiation received on each detector, providing, by means of the electrical signal outputs, an indication of both the magnitude and direction of change in the lens-to-surface distance.

Preferably, the transducer is formed by a circular detector which is surrounded by, but electrically isolated from and coplanar with an annular detector. Moreover, these detectors are preferably formed on a common substrate using integrated chip technology to provide matching response characteristics and to minimize alignment errors and the insulating space between the detectors, in which only negligible reflected beam radiation is lost.

The present invention also includes a focusing system that utilizes the transducer to both control the focusing elements and derive any information imparted to the reflected beam from the reflected surface. The transducer is positioned to receive the entire reflected beam collectively on the inner and the outer detectors over a normal range of anticipated focus adjustment, such that focus errors are derived by subtractively combining the electrical signal outputs of these detectors, while the information is derived by additively combining the signals.

The optical transducer and focusing system of the present invention is particularly adapted for use with an apparatus, such as a video disc player, in which an information surface bearing microscopically sized information indicia is moved relative to a reading source beam at a high rate of speed. In such an apparatus, the ability to maintain a sharp focus of the source beam to a spot which is substantially the same size as the microscopic information indicia, despite the high velocity at which surface imperfections in the disc move past the spot, is critical in order derive the information content of the disc.

It is a further aspect of the present invention that the ratio of the areas of the inner and outer detectors, as well as the positioning of the transducer along the path of the reflected beam, must be selected to achieve desired transducer response characteristics, while minimizing transducer sensitivity to tracking error and to variations in source beam power, and minimizing nonlinearity in the response of the outer detector relative to the inner detector. Preferably, the area of the inner detector is made as small as practicable, while the ratio of the area of the outer detector to the area of the inner detector is made as large as practicable. The transducer may be positioned along the path of the reflected beam such that equal radiation is detected in the inner detector and the outer detector when the source beam is precisely focused on the disc surface, resulting in equal electrical signal outputs from the detectors which subtractively combine to zero. Positioning the transducer otherwise results in a differential signal other than zero, introduces nonlinearity into the response of the outer detector relative to the inner detector and creates a sensitivity to source beam power variations that can be mistakenly interpreted as focusing errors. Appropriate biasing circuitry and transfer function compensation means are provided to minimize these problems.

In accordance with an alternative embodiment of the present invention, an auxiliary lens is disposed between the objective lens and the detectors in the reflected beam path. The auxiliary lens is positioned such that tracking errors from the video disc surface are not amplified, while distance errors between the objective lens and the video disc surface are amplified. In such a system, a variation of the distance between the disc and the objective lens produces a focal plane on the opposite side of the objective lens which is not coincidental with the optical center of the auxiliary lens. The expanded, out-of-focus beam now passing through the auxiliary lens is amplified by a concavo-concave structure. The concentric ring detector arrangement receives the amplified beam in an unequal ratio of light intensities on the two detectors. The difference is amplified by the auxiliary lens to generate a steeper correction signal having an improved signal to noise ratio.

The foregoing and other novel features which are believed to be characteristic of the invention, both as to organization and method of operation, together with further advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DETAILED DESCRIPTION

Figure 1:
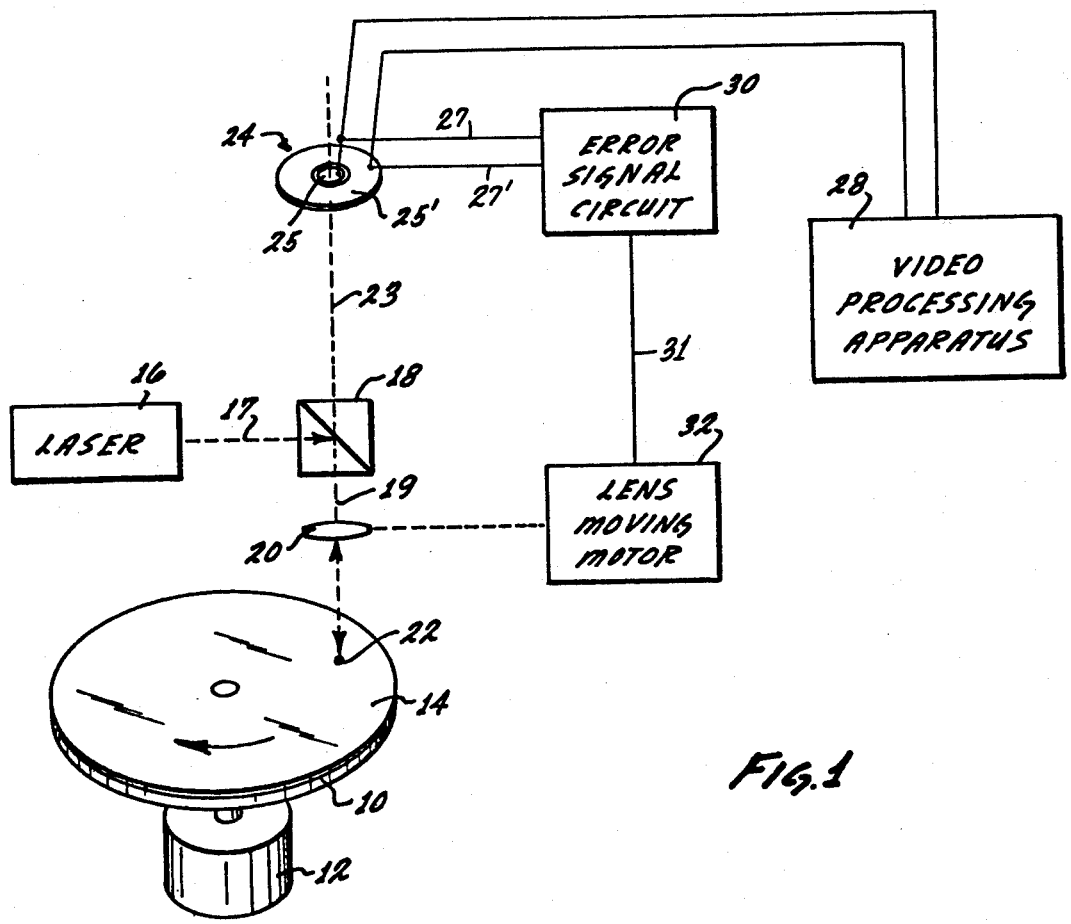
FIG. 1 is a simplified perspective view of a preferred embodiment of the present invention, shown employed with an illustrative video disc player.

Referring now to the drawings, and particularly to FIG. 1 thereof, a presently preferred embodiment of the invention is shown for purposes of illustration, utilized in conjunction with a schematically represented video disc player. The same numerals will be used in the several views to represent the same elements.

The player includes a turntable 10 rotated by a motor 12 and carrying a video disc 14 on which a plurality of microscopic circular or spiral information tracks are formed. A radiant source beam 17, represented only by its axis in FIG. 1, is produced by a laser 16 and is directed by an optical system to the surface of the disc 14. Herein, a simplified optical system is shown in which a beam splitter 18 receives the source beam 17 from the laser 16 and reflects it along a path 19 through a microscope objective lens 20, which is movable along the path for focusing the beam to a precise scanning spot 22 on the surface of the disc 14. Not shown is an appropriate carriage assembly for translating the disc 14 in the radial direction, normally at a rate equal to the recorded pitch of the information tracks, and fine beam steering elements to control the path 19 of the source beam 17 to cause the spot 22 to precisely follow the information tracks.

The source beam 17 is reflected from the surface of the disc 14 and is modulated by information indicia, such as video and audio information, which can be stored as successive light reflective and non-reflective regions in the information tracks. A reflected beam 23, also represented only by its axis FIG. 1, returns through the objective lens, along the path 19 of the source beam 17, and through the beam splitter 18, without reflection, to a photosensitive transducer, indicated generally at 24, which develops a pair of electrical signals in accordance with a principal aspect of the present invention, to be described in detail below.

The electrical signals developed by the transducer 24 are combined in a prescribed manner to yield two general types of signals, a focus error signal indicative of the focus condition of the spot 22 on the surface of disc 14, and an informational signal representative of the information content of the reflected beam 23 imparted from the disc. Another transducer, not shown, is normally also employed to develop a tracking error signal to control the fine beam steering elements mentioned above.

Specifically, the pair of electrical signals from the transducer 24 are transmitted over lines 27, 27' to an error signal circuit 30, wherein the focus error signal is developed and is transmitted, over line 31, to a lens moving motor 32 that is shown mechanically coupled to the objective lens 20 for moving it along the optical path 19 of the source beam 17 to maintain the spot 22 in focus. Simultaneously, the same pair of electrical signals are transmitted by the same lines 27, 27' to an information processing apparatus, wherein appropriate signal processing is accomplished in accordance with the type of information stored on the information carrier, such as the usual type video and audio signals, as well as digital information. Suitable alternatives, such as the illustrated video processing apparatus 28, are well known and no further details will be given herein, since such details do not form a part of the present invention.

The information tracks and the information stored therein are programmed or recorded on the surface of the video disc 14, in a highly dense manner. Typically, the tracks have a normal width of less than one micron and adjacent tracks are spaced a like distance apart. The successive reflective and non-reflective regions are stored within the tracks and can range between one micron and 1.5 microns in length along the track. It is contemplated that approximately fifty-five thousand tracks will be formed on one side of a disc that is the size of a phonograph record, to yield about one-half hour of playing material, with the disc rotating at the relatively high rate of about 1,800 r.p.m.

From the foregoing, it will be appreciated that the spot 22 formed by focusing the source beam 17 on the surface of the video disc 14 should not be appreciably larger in diameter than the length and width of the information indicia stored in the information tracks. Otherwise, the spot 22 may cover more than one information track or a longer segment of an information track than desired, resulting in "cross-talk" being introduced from information indicia adjacent the particular indicia desired to be instantaneously read by the source beam 17. In this regard, the distance between the objective lens 20 and the surface of the disc 14 at the spot 22 is critical, since a variation in this distance will cause a loss of focus of the source beam 17, resulting in enlargement of the spot. Such variations in this distance can be caused by slight disc warpage, disc eccentricity, and plastic thickness variation or ripple patterns in the disc, as well as vibration of the optical system.

Although these variations can be compensated for by moving the objective lens 20 along the optical path 19 of the source beam 17 to maintain a substantially uniform distance between the objective lens and the surface of the disc 14, it will be appreciated that a focus system designed to detect the focus condition of the spot 22 and move the objective lens 20 accordingly, must be capable of detecting very slight variations in the critical distance between the lens and the disc. Further, such a focus system must rapidly adjust the position of the objective lens 20 to follow the surface of the disc 14 in view of the high rate at which it is moving past the spot 22, particularly near the outer edge of the disc. The manner in which the transducer of the present invention detects variations in this critical distance and maintains the source beam focused on the disc surface will now be described with particular reference to FIGS. 2-6.

Figure 2:
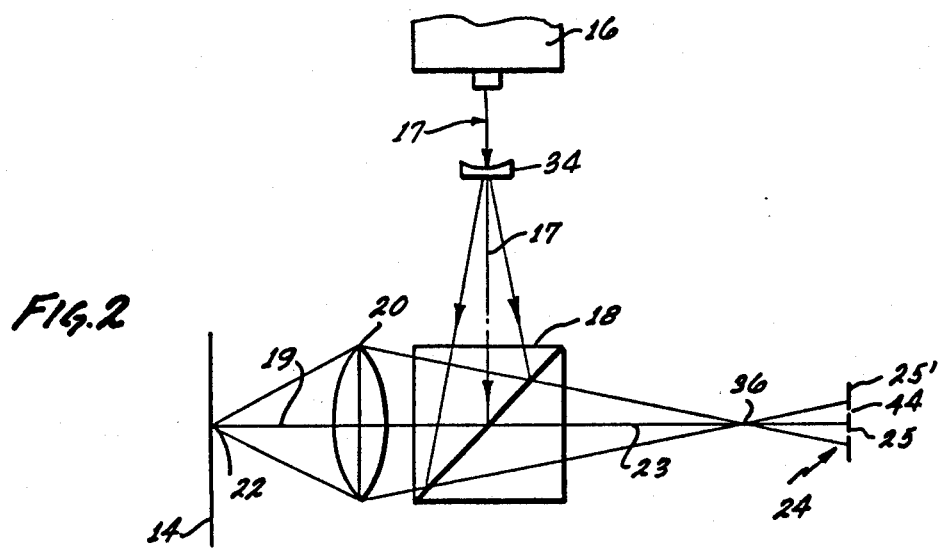
FIG. 2 is a diagrammatic and simplified representation of a portion of FIG. 1, showing the radiant beam in focus on a surface of a video disc.

As illustrated in FIG. 2, the source beam 17 is produced by the laser 16 in the form of a collimated light beam and is passed through a lens 34 (not shown in FIG. 1) for spreading the source beam to fill the entrance aperture of the objective lens 20, after the beam is reflected by the beam splitter 18. Improved results are found when the entrance aperture is overfilled by the source beam 17, resulting in maximum light intensity being focused at the spot 22 by the objective lens 20. The reflected beam 23 returns through the objective lens 20, following the path 19 of the source beam 17, except that it passes through the beam spltter 18 without reflection. The reflected beam has a focus reestablished by the objective lens 20 on the side thereof opposite the surface of the video disc 14. As seen in FIG. 2, the reflected beam 23 converges to an image plane 36 and expands from the image plane in a substantially conical form. While the path of the reflected beam 23 in the drawings is represented as being straight, the path could be re-directed using mirrors or the like to accommodate any design objective.

Essentially, the transducer 24 is disposed in the path of the reflected beam 23 on one side of the image plane 36. The transducer 24 receives the reflected beam 23 and provides the aforementioned pair of electrical signals in response thereto. In the present invention, the transducer 24 comprises two separate photosensitive detectors 25, 25', which are electrically insulated one from the other. Each detector 25, 25' develops an electrical signal corresponding to the portion of the reflected beam 23 that it receives. As discussed above, this pair of electrical signals is transmitted over lines 27, 27' to error signal circuit 30, for deriving a signal to control the lens-moving motor 32 and thereby maintaining the objective lens 20 at a substantially uniform distance from the surface of the video disc 14. The same pair of electrical signals is directed over the same lines 27, 27' to the video processing apparatus 28 where the signals are summed for deriving and processing the information content of the reflected beam 23.

Figure 5:
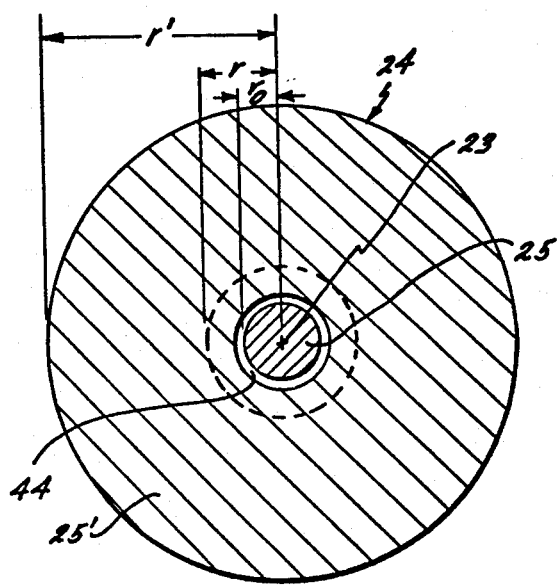
FIG. 5 is an elevational view of the preferred transducer of the invention.

The transducer 24, as shown most clearly in FIG. 5, comprises a circular shaped central or inner detector 25 having its center coincidental with the axis defined by the reflected beam 23. An annular or outer detector 25' is coplanar and concentric with the central detector 25, with a narrow annular space 44 separating and insulating the two detectors from each other. Forming the photosensitive surface detectors 25, 25' integrally on a common substrate is preferable in that it helps assure precise relative placement of the two detectors and avoids misaligning shifts. Further, integrated chip forming techniques tend to insure that the two detectors 25, 25' have matching response characteristics and also can result in a very small annular space 44.

In FIG. 5, the symbol $r_0$ is used to denote the radius of the central, circular detector 25, while the symbol $r'$ is used to indicate the outer radius, as measured from the axis of the reflected beam 23, of the outer detector 25'. The symbol r is used to indicate the radius of the reflected beam image formed on the plane defined by the photosensitive surfaces of the detectors 25, 25'.

At this time, it can be noted that once the radius of the inner detector 25 and the radius of the outer detector 25' have been selected, the transducer 24 can be positioned along the axis of the reflected beam 23 so that the ratio of the area of each detector illuminated when the spot 22 is precisely focused on the surface of the disc 14 is a prescribed value. For reasons that will be explained below, it is preferred that the radiation received by the inner detector 25 should equal the radiation received by the outer detector 25' when the spot 22 is focused. This should result in the pair of electrical signals developed by the detectors 25, 25' being of equal magnitude. If it is assumed that there is an equal light distribution over a plane cutting the reflected beam 23 and that the area of the annular space 44 is negligible, the relationship between r and $r_0$ under this circumstance will be:

$r = \sqrt{2} \, r_0$

Figure 3:
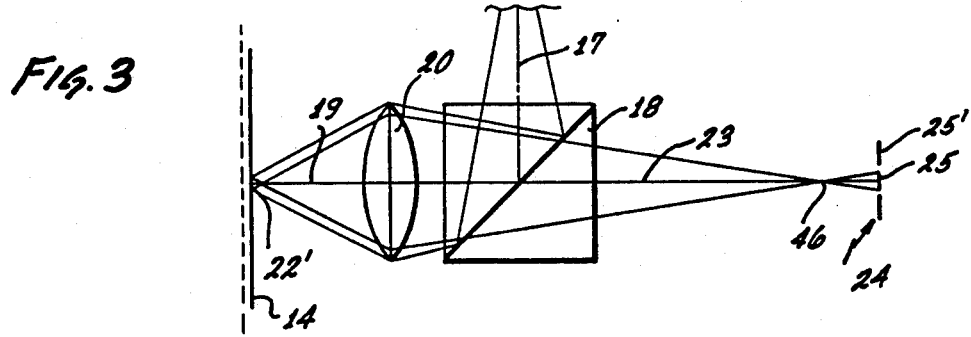
FIG. 3 is a view similar to FIG. 2, having the radiant beam out focus, with the video disc surface shifted toward an objective lens.
Figure 4:
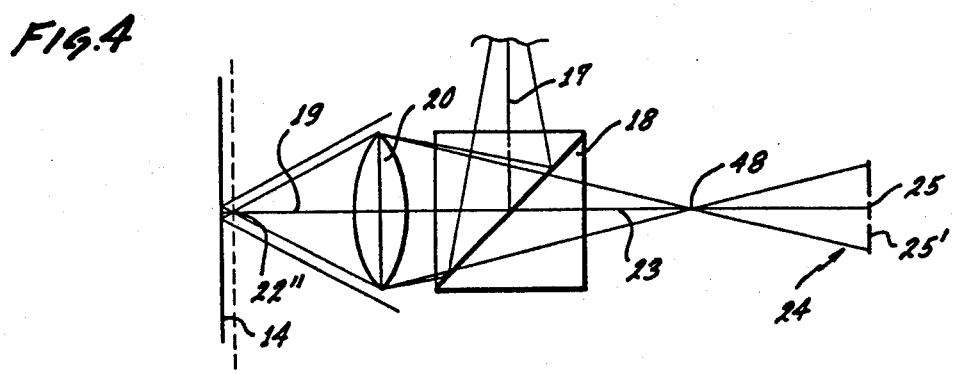
FIG. 4 is a view similar to FIG. 2, having the radiant beam out of focus, with the video disc surface shifted away from the objective lens.

Referring now to FIGS. 3 and 4, there are shown illustrations similar to FIG. 2, but having a deviation in the distance between the surface of the video disc 14 and the objective lens 20. It can be seen that these deviations tend to enlarge the size of the spot 22 formed on the surface and correspondingly shift the position of an image plane of the reflected beam 23 along the axis of the reflected beam. This shifting of the image plane results in expansion or contraction of the radius r of the reflected beam image formed at the detector plane, thereby directly affecting the magnitude of the electrical signals transduced respectively by the detectors 25 and 25'.

In the case of FIG. 3, the surface of the disc 14 has moved closer to the objective lens, resulting in an enlarged, unfocused spot 22' at the disc surface, an image plate 46 shifted closer to the transducer 24 and a contraction of the radius r, i.e., concentrating the reflected beam more on the inner detector 25 than the outer detector 25'. In the case of FIG. 4, the opposite phenomenon is demonstrated, wherein the surface of the video disc 14 deviates further away from the objective lens 20, also resulting in an enlarged spot 22", but producing an image plane 48 that is shifted away from the transducer 24 and resulting in expansion of the radius r, i.e., enlarging the reflected beam image so that relatively more radiation falls on the outer detector 25' than the inner detector 25.

In these illustrative examples, it should be appreciated that the out-of-focus condition of the spot 22 has been detected by the transducer without deminution in the radiation available for deriving the information content of the reflected beam 23, except for the negligible loss of light in the insulative, annular space 44. Hence, a major drawback of many prior art detector systems, in which focus error detectors separate from information detectors are utilized, often resulting in the focus error detectors preventing some radiation from reaching the the information detectors, is avoided.

Figure 6A:
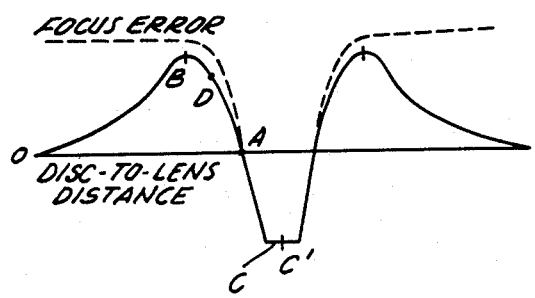
FIG. 6A is a waveform illustrating various characteristics of the transducer and the error signal circuit shown in FIG. 6.
Figure 6:
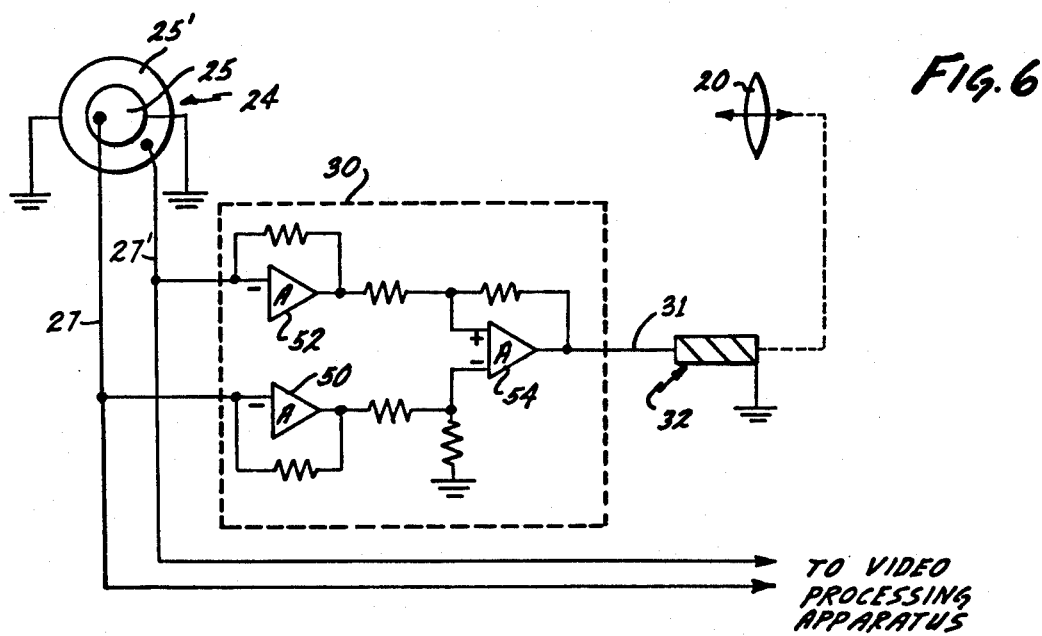
FIG. 6 is an schematic electrical circuit diagram of an error signal circuit and control system.

Turning next to FIG. 6, the detectors 25 and 25' individually connected to amplifiers 50, 52 respectively in the error signal circuit 30 are seen in greater detail. The amplified signal from the outer detector 25' is directed to the positive input of a summing amplifier 54. The amplified signal from the inner detector 25 is applied to the negative input of the same amplifier 54. If the detectors 25, 25' are positioned along the axis defined by the reflected beam 23, such that equal radiation is received on each detector when the spot 22 is precisely focused, then the electrical signals developed by the detectors should be equal when the spot is in focus. In that event, the output signal from the amplifier 54 will be zero. As described above, this output signal is transmitted over line 31 to the lens moving motor 32, which will not be actuated in such a situation and the objective lens 20 will remain at its in-focus distance from the surface of the video disc 14.

On the other hand, if the surface of the video disc 14 deviates towards or away from the objective lens 20, as described above with reference to FIGS. 3 and 4, then the relative radiation received on the inner detector 25 and the outer detector 25' will change accordingly, resulting in unequal electrical signals being developed by the detectors. When the amplified outputs of the detectors 25, 25' are electrically subtracted in amplifier 54, its output signal will have a sign and a magnitude representative of the direction and distance that the surface of the video disc 14 has deviated from the in-focus position relative to the objective lens 20. The lens-moving motor 32 is activated by the output signal from the amplifier 54 to move the objective lens 20 towards or away from the surface of the video disc 14 as the case may be, to re-establish the in-focus condition. The lens moving motor 32 continues to operate until such time as the radiation received on the inner detector 25 is equal to the radiation received on the outer detector 25'. It can be appreciated that the objective lens 20 is then spaced from the surface of the video disc 14 such that the spot 22 formed by focusing the source beam 17, is the smallest size consistent with the wavelength of light being used and the size of the information indicia recorded in the information tracks on the disc, approximately 1 micron in diameter as seen in FIG. 2 of the drawings.

The foregoing discussion has assumed that the transducer 24 is positioned along the axis defined by the reflected beam 23 such that equal radiation is received on each detector 25, 25' when the spot 22 is focused. It was noted that positioning the transducer to achieve this equality is preferable. The reason for this will now be explained with reference to the waveform shown in FIG. 6A.

The waveform of FIG. 6A is a somewhat idealized representation of a differential focus error signal E, such as that appearing at the output of amplifier 54 (FIG. 6), which is produced by moving the objective lens 20 over a relatively large distance d along the path of the source beam 17. To illustrate, typically upon start-up of the video disc player, the objective lens 20 is in a retracted position substantially removed from its position of optimum focus. In this retracted position, the reflected bean image formed at the detector plane has a much larger radius than even the radius r' of the outer detector 25', such that the difference in radiation power received on the inner detector 25 and the outer detector, respectively, can be relatively small and the focus error signal E approaches zero, as shown at the left of the waveform.

As the objective lens 20 is moved along the optical path 19 towards its optimum focusing position relative to the surface of the disc 14, the magnitude of the focus error signal E tends to increase as the reflected beam radiation becomes more concentrated on the outer detector 25'. At point B on the wave form, radius r of the reflected beam image at the detector plane is equal to radius r' of the outer detector 25'.

As the objective lens 20 continues to move towards its optimum focusing position, the focus error signal tends to decrease in magnitude until it reaches zero, shown as point A on the waveform, in which equal radiation is being received on the inner detector 25 and the outer detector 25'. If the objective lens is moved even further along the optical path 19 towards the surface of the video disc 14, the focus error signal E wil decrease to a minimum negative value, indicating that the radius r of the reflected beam image at the detector plane is less than or equal to the radius $r_0$ of the inner detector 25. Assuming that the objective lens 20 can be moved even closer to the video disc without striking it, the focus error signal E would commence to increase again after the image plane of the reflected beam passed through the detector plane and, the radius r increased to a value greater than $r_0$. Point C on the wave form represents the situation wherein an image plane of the reflected beam is located at the detector plane.

By selecting a location along the axis defined by the reflected beam 23 for positioning the transducer 24, the radius r of the reflected beam image at the detector plane and, hence, the magnitude of the focus error signal E, can be selected as a "quiescent" point for the in-focus condition of the scanning spot 22. Of course, the negative slope portions of the waveform intermediate points B and C is the only region wherein stable operation of the focus control system occurs. For instance, instead of selecting point A on the wave form as the quiescent operating point, point D could be selected such that relatively more radiation is received by the outer detector 25' than the inner detector 25 when the spot 22 is focused. In such an event, it would be necessary to modify the error signal circuit 30 so that no signal is transmitted over line 31 to the lens-moving motor 32 and the objective lens 20 will not be moved. For this purpose, a bias signal can be provided which, when added to the electrical output of the inner detector 25 would make the difference equal to zero.

It should also be noted, however, that the electrical signal response of the outer detector 25' is nonlinear relative to the inner detector 25 with change of focus at point D, as reflected by the curvature of the the negative slope of the waveform. It would therefor be preferable to compensate for this nonlinearity so that the detection of focus errors and the dynamic response of the focus system is not overly dependent on the direction that the objective lens 20 must be driven in order to correct the focus. An even further problem is that a change of intensity of the source beam affects the relative intensities impinging upon the detectors 25, 25', independently of changes in focus. Unless compensated, such a change in intensity could be mistakenly interpreted as an error in focus.

Figure 9:
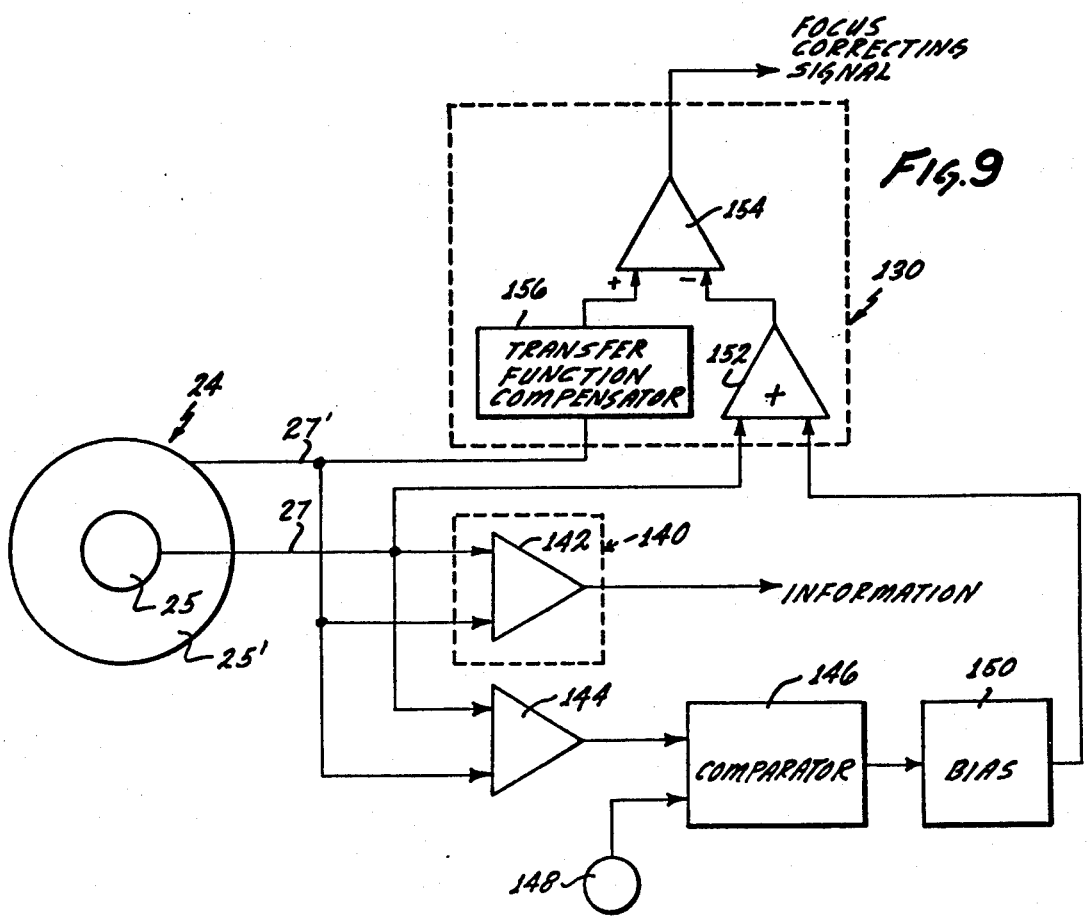
FIG. 9 is a simplified block diagram of another embodiment employing an auxiliary lens between an objective lens and the transducer.

As shown in FIG. 9, a modified network is provided from which the information signal and a focus-correcting signal can be derived from the output of the transducer 24. The electrical output of the inner detector 25 is provided along line 27, while the output of the outer detector 25' is provided on line 27'.

The output of both detectors are applied to a first differencing network 130 and an adding network 140. The adding network 140 includes a high frequency amplifier 142 that is capable of additively combining the high frequency components of the impinging radiation representing the recorded video signal. A second, low frequency sensitive additive network 144 is provided to detect the variations in intensity that may be caused by variations of laser power.

The output of the low pass amplifier-adder 144 is applied to a comparator 146 which has, as a second input, an adjustable base line potential source 148, which can be set to equal the signal produced at average laser power levels. The output of the comparator 146 is applied to a biasing network 150 the output of which is applied to an adding circuit 152 within the focus correction network 130. The output of the inner detector 25 is applied as a second input to the adding circuit 152, the output of which is applied as one of the inputs to a differencing network 154. The focus correcting signal is derived from the differencing network 154. A second input of the differencing network 154 comes from a transfer function compensator 156, which modifies the output of the outer detector 25' received over line 27' and corrects for nonlinearity in the waveform by selectively adjusting the gain of the electrical signal output of the outer detector 25'.

The waveform illustrated in FIG. 6A is also useful for describing the effect that selection of the radius $r_0$ of the inner detector 25 and the radius 4' of the outer detector 25' has on transducer response characteristics. Specifically, it has been determined that it is desirable to select the radius $r_0$ as small as practicable, because the negative slope of the waveform portion intermediate points B and C tends to steepen as a result and renders the focus system more responsive to changes in focus. An inner detector with a radius of about 45 microns has been successfully utilized.

Also, it has been determined that the ratio of the radius r' to the radius $r_0$ should be made as large as practicable because this likewise tends to steepen and linearize the negative slope of the waveform (FIG. 6A), particularly in the portion intermediate points B and A, effectively increasing the magnitude of the positive peak defined by point B on the waveform. In fact, theoretically the ratio of the radius r' to the radius $r_0$ should be infinite for optimum results, in which case the positive going portion of the waveform would assume a shape substantially like that shown by the dashed lines in FIG. 6A. A ratio of radii between outer and inner detectors of about 10:1 has been found to be satisfactory, and it is believed that a ratio of about 5:1 would be acceptable. Ratios as small as 2:1 are believed unreliable.

Two embodiments of a lens focusing system have been shown providing structure which take maximum advantage of the physical shape of the operative elements, such as the source beam 17. The natural shape of the light beams emitted from laser sources, for example, are cylinderical or conical in shape, having a central axis. The structure of the present detector and transducing means provides for a collecting and receiving of substantially the entire light beam modulated by the moving surface of the disc 14.

As noted above, only a very small amount of light is lost in the annular space 44 separating the two detectors. No portions of the modulated beam are lost beyond the edges of the detector, thus providing for a stronger and a more pronounced video display or any other display developed from the modulated beam.

It is to be noted that the transducer 24 can be positioned closer to the objective lens 20 than the image plane 36 of FIG. 2. It is only necessary that the transducer 24 be positioned non-coincidentally with the image plane 36 as determined by the in-focus position of the objective lens 20. It may be appreciated that if the transducer 24 were placed in the image plane 36 itself, any changing of the image plane either closer to or further away from objective lens 20 would only cause the outer detector 25' to receive more light. Thus there would be no way of distinguishing whether the objective lens 20 should be closer to, or farther away from the surface of the video disc 14 in order to bring the light beam 17 back into correct focus.

If the transducer 24 were to be placed closer to the objective lens 20 then the in-focus image plane 36, the signal input amplifier 54 should be reversed. Otherwise, the system will operate in accordance with the description above.

Figure 7:
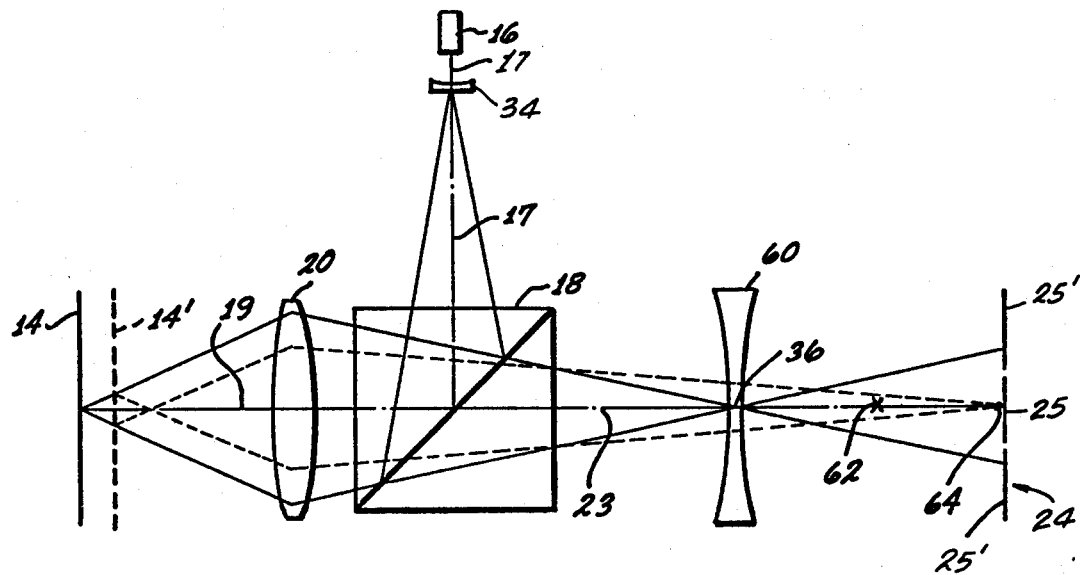
FIG. 7 is a diagrammatic and simplified representation of a portion of the system of FIG. 1, showing an alternative embodiment of the invention.
Figure 8:
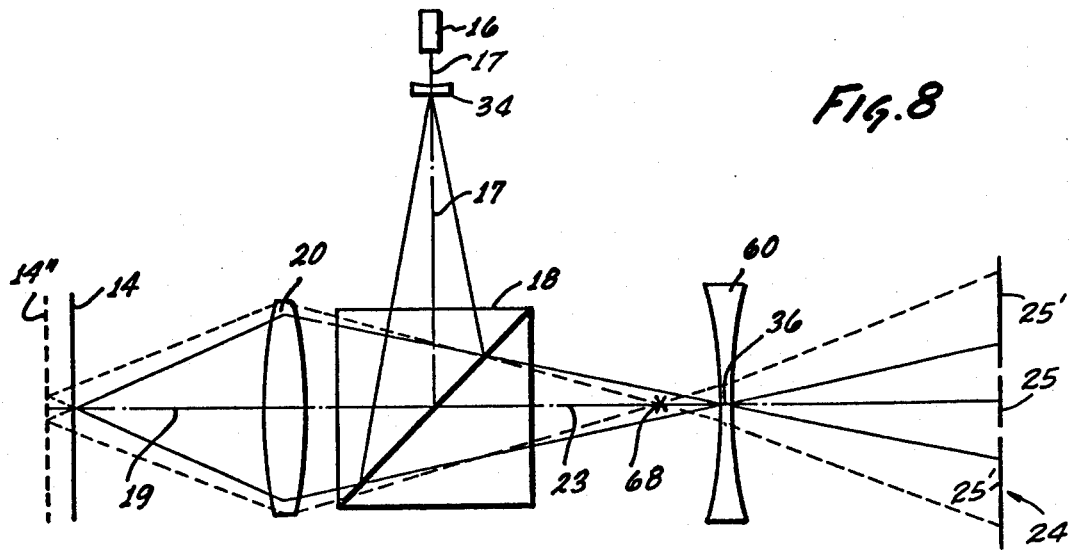
FIG. 8 is a simplified diagrammatic representation similar to FIG. 7, having the radiant beam out of focus, with a video disc surface shifted away from the objective lens.

An alternative embodiment of the present invention is shown in FIGS. 7 & 8. The source beam 17 from the laser 16 is directed to a reflecting surface in the beam splitter 18. The source beam 17 then continues along the path 19 through the objective lens 20, which focuses the the beam upon the moving surface of the video disc 14.

The reflected beam 23 is provided by reflecting the source beam 17 from the disc surface and returning the reflected beam surface and returning the reflected beam along the path 19 through the objective lens 20 and through the beam splitter 18 without reflection. In these respects, the schematics of FIGS. 7 and 8 are similar to that of FIG. 2.

In the the schematic of FIG. 7, a movement of the surface of the video disc 14 closer to the objective lens 20 is shown in phantom at 14'. The reflected beam 23 travels along the path 19 in the pattern of the dashed lines. A secondary or auxiliary lens 60 is placed at the in-focus image plane 36 of the beam reflected from the surface of the video disc 14. The axis of the auxiliary lens 60 is made to coincide with axis defined by the reflected beam 23. In the embodiment shown, a concavo-concave lens is shown. Other lenses may be selected in accordance with the teachings below.

In the absence of the auxiliary lens 60, the effect of moving the surface 14 to the position of 14' would be to transfer an image plane of the reflected beam from point 36 to point 62. By inserting the lens 60 at the in-focus image plane 36, however, the reflected beam 23 is refracted to have an image plane appear at point 64 substantially closer to the detector plane than the point 62. The effect of inserting the auxiliary lens 60 in the situation where the surface of the video disc 14 is moved closer to the objective lens 20, therefore, is to concentrate the reflected beam 23 more on the inner detector 25. In such a circumstance, the light received by the finner detector 25 is more intensified, having a smaller radius r than in the situation absent the auxiliary lens 60.

The opposite effect is achieved in the circumstance where the surface of the video disc 14 is moved further away from the objective lens 20, as represented by the phantom lines 14" of FIG. 8. In such a circumstance, the reflected beam 23 follows the boundaries marked by the broken lines of FIG. 8. As explained above, the image plane of the out-of-focus reflected beam 23 is moved from the in-focus image plane 36 to an image plane 68 further from the transducer. The auxiliary lens 60 has the effect of refracting the reflected, out of focus light beam 23 into a greater dispersion pattern, having a greater radius r at the detector plane.

In the situation of FIG. 8, the inner detector 25 receives a substantially reduced portion of the reflected beam 23 relative to the radiation received by the outer detector 25'. The effect of auxiliary lens 60, therefore, is to amplify the defocusing effects of the movement of the video disc surface further away from the objective lens 20. It is to be noted that in the circumstances of both FIGS. 7 & 8, if the surface of the video disc 14 is spaced the proper, focused distance from the the auxiliary lens 60, there is no amplification of the the light beam passing therethrough to the transducer 24.

As mentioned earlier, frequently objective lenses, such as the illustrated objective lens 20, are combined with various tracking systems for keeping the scanning spot 22 within the lateral boundaries of the information track on the moving surface of the video disc 14. Eccentricities in the circular or spiral plot of the informations tracks may cause the tracking system to move the spot 22 radially of the disc. The reflected beam 23 thus will be moved laterally at the plane of the transducer 24.

A representative example of such a tracking system is described in a co-pending application Ser. No. 766,928, filed on behalf of Richard L. Wilkinson, Jan. 18, 1977, and assigned to the assignee of the present of invention and which is a continuation of his application Ser. No. 510,163, filed Sept. 30, 1974, now abandoned. This application is incorporated herein for convenient reference.

In the past such lateral movement inevitability appeared as a focusing error to detectors. In the present invention some such lateral movement has no differential effect on the the transducer 24. If the edge of the beam at the plane of the detectors 24, as defined by the radius r, moves up to and becomes almost coincidental with the annular space 44, the relative amounts of radiation received by the inner detector 25 and the outer detector 25' will not change. In the example described above, where the radius r will be approximately $\sqrt{2} r_0$ when the beam is focused at a spot, such as spot 22, lateral movement of the beam so as to move the axis defined by the reflected beam 23 as much as 40 percent away from the center of the inner detector 25 can be tolerated without any change in the relative powers of change in the relative powers of the light detected by the two detectors 25 and 25'. Such a situation assumes an even distribution of the light across a cross-section of the beam itself. This assumption will be discussed in greater detail below.

If the tracking error is large enough in relation to the size of the central detector, it becomes desirable to use an auxiliary lens. Such a large tracking error, it will be appreciated, will have a direct influence on the relative amount of light received by the individual detectors 25 and 25'. The lens focusing system of the present invention under such a circumstance may read such a signal difference as a focusing error and adjust the position of the objective lens appropriately.

As may be seen, the auxiliary lens 60 has the effect of amplifying the changes in the radius r of the reflected beam image when the source beam is out of focus on the moving surface of the video disc 14. Any deviation of the source beam otherwise, however, does not affect the position of the in-focus image plane 36 relative to the auxiliary lens 60. Since there is no amplification of the source beam deviations when the image plane 36 is located at the auxiliary lens 60, the effects of tracking deviations of the source beam are not amplified. In other words, the focus system will be relatively more responsive to real focus errors, as compared to tracking errors mistakenly interpreted as focus errors, with the auxiliary lens than without it.

An alternative technique for minimizing the tracking error influence on the focusing error-detecting system of the present invention is to minimize the area of the inner detector 25 in relation to the overall reflected beam image received at the detector plane. This would be a further consequence of operating at Point D on the waveform, FIG. 6A. It can be noted that the effect of interposing auxiliary lens 60 between the objective lens and the transducer 24 is to make the inner detector 25 appear smaller.

Normally, it is expected that a cross-section of a light beam produced by a laser source, such as that taught herein, will have a Gaussian distribution across a selected diameter of the light. It is contemplated that the light beam reflected from the moving surface of the video disc 14, however, will be modulated by the information indicia stored on the individual information tracks. The deviations of the information track are believed to be concentrated more in the center of the information track than at the lateral edges. Consequently, the distribution of light across a diameter of a cross-section of the reflected beam is believe to be more uniform than that of a Caussian distribution, which might have a more concentrated or intense amount of the light power along the axis defined by the reflected beam 23.

In situations where it can be determined that a cross-section of the reflected beam 23 will be substantially different from an even distritution of light power, adjustments can be made in the amplifiers 50 and 52 so as to make the signals fed to the differential amplifier 54 equal in the case of a focused source beam. Other compensating adjustments may also be made, such as adjusting the radius $r_0$ of the central detector 25.

The aforedescribed transducer and lens focus system of the present invention satisfies a need for an improved optical transducer and focus systems making use of substantially the entire light beam both for reading out modulated information and for operating the focus system in a more accurate and reliable manner.

It will be apparent from the foregoing that, while particular embodiments forms of the invention have been illustrated and described, various modifications can be made without departing from the spirit and scope of the invention. Accordingly, it is not intended that the invention be limited, except as by the appended claims.

We claim:

1. A lens focusing system, comprising:
source means for producing a beam of radiation to be focused on and reflected from a surface;
a lens;
focusing means for moving said lens to focus said beam of radiation on the surface;
transducer means, disposed in the path of the reflected radiation,
said transducer means including a first detector having a radiation-sensitive surface adapted to receive a first portion of said reflected radiation, said first detector developing a first electrical signal indicative of the radiation received thereon, and
said transducer means further including a second detector, electrically isolated from said first detector, having a radiation-sensitive surface at least a portion of which is disposed around the periphery of said radiation-sensitive surface of said first detector and adapted to receive a second portion of said reflected radiation, said second detector developing a second electrical signal indicative of the radiation received thereon; and
control means, responsive to said transducer means, for comparing said first signal with said second signal and controlling said focusing means to move said lens as a function of the difference between said first and second signals.

2. A lens focusing system as defined in claim 1, wherein said radiation-sensitive surface of said first detector and said radiation-sensitive surface of said second detector are substantially coplanar.

3. A lens focusing system as defined in claim 2, wherein said radiation-sensitive surface of said first detector is circular in shape.

4. A lens focusing system as defined in claim 3, wherein said radiation-sensitive surface of said second detector is annular in shape.

5. A lens focusing system as defined in claim 1, wherein said radiation-sensitive surface of said first detector and said radiation-sensitive surface of said second detector are formed on a common substrate.

6. A lens focusing system for use in an apparatus for reading information carried by an information bearing surface, said system comprising:

source means for producing a source beam of radiation to be focused on the information bearing surface, at least a portion of said source beam being reflected from the surface and modulated by the information carried thereby;

optical system means for directing said source beam along a first optical path from said source means to the information bearing surface and for focusing the reflected beam of radiation at an image plane along a second optical path removed from the information bearing surface, said optical system means including a lens, movable along said first optical path, to focus said source beam on the information bearing surface;

transducer means, disposed in said second optical path, non-coincidental with said image plane of said reflected beam, for receiving said reflected beam, said transducer means including a first detector having a radiation-sensitive surface adapted to receive a first portion of said reflected beam, said first detector developing a first electrical signal indicative of the radiation received thereon, and said transducer means further including a second detector, electrically isolated from said first detector, having a radiation-sensitive surface at least a portion of which is disposed around the periphery of said radiation-sensitive surface of said first detector and adapted to receive a second portion of said reflected beam, said second detector developing a second electrical signal indicative of the radiation received thereon;

control means, responsive to said transducer means, for comparing said first signal with said second signal; and means, responsive to said control means, for moving said lens along said first path to focus said source beam on the information bearing surface.

7. A lens focusing system as defined in claim 6, and further including:

means, responsive to said transducer means, for combining said first signal and said second signal to derive the information contained in said reflected beam.

8. A lens focusing system as defined in claim 6, wherein said radiation-sensitive surface of said first detector and said radiation-sensitive surface of said second detector are substantially coplanar.

9. A lens focusing system as defined in claim 6, wherein said first detector and said second detector are formed on a common substrate.

10. A lens focusing system as defined in claim 6, wherein said radiation-sensitive surface of said first detector is centered substantially on an axis defined by said reflected beam.

11. A lens focusing system as defined in claim 10, wherein said radiation-sensitive surface of said second detector is substantially concentric with said radiation-sensitive surface of said first detector.

12. A lens focusing system as defined in claim 6, wherein said radiation-sensitive surface of said second detector has an area substantially 25 times or more greater than the area of said radiation sensitive surface of said first detector.

13. A lens focusing system as defined in claim 6, wherein the said radiation-sensitive surface of said first detector receives radiation in a prescribed ratio to the radiation received on said radiation-sensitive surface of said second detector, when said source beam is in optimum focus on the information bearing surface.

14. A lens focusing system as defined in claim 13, wherein said ratio is substantially 1:1.

15. A lens focusing system as defined in claim 6, and further including:

auxiliary lens means, disposed in said second optical path substantially at said image plane when said source bean is in optimum focus on the information bearing surface, for refracting said reflected beam only when said source beam is out of focus.

16. A lens focusing system as defined in claim 15, wherein said auxiliary lens means is centered substantially on an axis defined by said reflected beam.

17. A lens focusing system for use in an apparatus for reading information carried by an information bearing surface, said system comprising:

source means for producing a source beam of radiation to be focused on the information bearing surface, at least a portion of said source beam being reflected from the surface and modulated by the information carried thereby;

optical system means for directing said source beam along a first optical path from said source means to the information bearing surface and for focusing the reflected beam of radiation at an image plane along a second optical path removed from the information bearing surface, said optical system means including a lens, movable along said first optical path, to focus said source beam on the information bearing surface;

transducer means, disposed in said second optical path, non-coincidental with said image plane of said reflected beam, for receiving said reflected beam, said transducer means including a first detector having a closed boundary defining a radiation-sensitive-surface of predetermined area disposed on an axis defined by said reflected beam, whereby said radiation-sensitive surface is adapted to receive a first portion of said reflected beam, said first detector developing a first electrical signal indicative of the radiation received thereon, and said transducer means further including a second detector having a radiation-sensitive surface substantially surrounding, but electrically isolated from and substantially coplanar with, said radiation-sensitive surface of said first detector, whereby said radiation surface of said second detector is adapted to receive a second portion of said reflected beam, said second detector developing a second electrical signal indicative of the radiation received thereon;

control means, responsive to said transducer means, for comparing said first signal with said second signal in a prescribed manner; and servo means, responsive to said control means, for moving said lens along said first path to focus said source beam on the information bearing surface.

18. A lens focusing system as defined in claim 17, and further including:

means, responsive to said transducer means, for combining said first signal and said second signal to derive the information contained in said reflected beam.

19. A lens focusing system as defined in claim 18, wherein said combing means combines said first signal and said second signal additively.

20. A lens focusing system as defined in claim 19, wherein said control means compares said first signal with said second signal differentially.

21. A lens focusing system as defined in claim 17, wherein said radiation-sensitive surface of said first detector and said radiation-sensitive surface of said second detector are substantially coplanar.

22. A lens focusing system as defined in claim 17, wherein said first detector and said second detector are formed on a common substrate.

23. A lens focusing system as defined in claim 17, wherein said radiation-sensitive surface of said first detector is centered substantially on an axis defined by said reflected beam.

24. A lens focusing system as defined in claim 23, wherein said radiation-sensitive surface of said second detector is substantially concentric with said radiation-sensitive surface of said first detector.

25. A lens focusing system as defined in claim 17, wherein said radiation-sensitive surface of said second detector has an area substantially 25 times or more greater than the area of said radiation sensitive surface of said first detector.

26. A lens focusing system as defined in claim 17, wherein said radiation-sensitive surface of said first detector receives radiation in a prescribed ratio to the radiation received on said radiation-sensitive surface of said second detector, when said source beam is in optimum focus on the information bearing surface.

27. A lens focusing system as defined in claim 26, wherein said prescribed ratio is substantially 1:1.

28. A lens focusing system as defined in claim 26, wherein said prescribed ratio is other than 1:1, and further including:
bias means, responsive to said source means, for altering said control means in response to variations in radiation power of said source beam, whereby said variations do not result in movement of said lens.

29. A lens focusing system as defined in claim 26, wherein said prescribed ratio is less than 1:1 and wherein said control means includes compensation means for compensating for non-linear changes in said second electrical signal relative to changes in said first electrical signal.

30. A lens focusing system as defined in claim 17, wherein said radiation-sensitive surface of said first detector is circular in shape.

31. A lens focusing system as defined in claim 30, wherein said radiation-sensitive surface of said second detector is annular in shape.

32. A lens focusing system as defined in claim 17, wherein said source means includes a laser.

33. A lens focusing system as defined in claim 17, wherein said reflected beam is directed from the information bearing surface through said lens along said second optical path, at least a portion of which is common to said first optical path.

34. A lens focusing system as defined in claim 17, and further including:
auxiliary lens means, disposed in said second optical path substantially at said image plane when said source beam is in optimum focus on the information bearing surface, for refracting said reflected beam when said source beam is out of focus.

35. A lens focusing system as defined in claim 34, wherein said auxiliary lens means is centered substantially on an axis defined by said reflected beam.

36. A lens focusing system as defined in claim 34, wherein said auxiliary lens means comprises a concave lens.

37. A lens focusing system as defined in claim 34, wherein said auxiliary lens means comprises a concavo-concave lens.

38. A lens focusing system for use in a player for reading video information carried by a moving information carrier having a reflective surface, said system comprising:
source means for producing a source beam of radiation to be focused on the reflective surface of the information carrier, at least a portion of said source beam being reflected from the reflective surface and modulated by the information carried by the information carrier;
optical system means for directing said source beam along a prescribed optical path from said source means to the reflective surface and for directing the reflected beam of radiation therefrom,
said optical system means including a lens, movable along said optical path, to focus said source beam on the reflective surface and to focus said reflected beam at an image plane removed from the reflective surface;
transducer means, disposed in the path of said reflected beam non-coincidental with said image plane, for receiving said reflected beam,
said transducer means including a first detector having a closed boundary defining a photosensitive surface of predetermined area substantially centered on an axis defined by said reflected beam, said first detector developing a first electrical signal indicative of the radiation from said reflected beam received thereon, and
said transducer means further including a second detector having a photosensitive surface concentrically surrounding, but electrically isolated from and substantially coplanar with, said photosensitive surface of said first detector, said second detector developing a second electrical signal indicative of the radiation from said reflected beam received thereon;
control means, responsive to said transducer means, for comparing said first signal with said second signal in a prescribed manner; and
servo means, responsive to said control means, for moving said optical lens along said optical path to focus said source beam on the reflective surface of the information carrier.

39. A lens focusing system as defined in claim 38, and further including:
means, responsive to said transducer means, for combining said first signal and said second signal to derive the information contained in said reflected beam.

40. A lens focusing system as defined in claim 39, wherein said combining means combines said first signal and said second signal additively.

41. A lens system as defined in claim 38, wherein said control means compares said first signal with said second signal differentially.

42. A lens focusing system as defined in claim 38, wherein said first detector and said second detector are formed on a common substrate.

43. A lens focusing system as defined in claim 38, wherein said photosensitive surface of said second detector has an area substantially 25 times or more greater than the area of said photo-sensitive surface of said first detector.

44. A lens focusing system as defined in claim 38, wherein said photosensitive surface of said first detector receives radiation in a prescribed ratio to the radiation received on said photosensitive surface of said second detector, when said source beam is in optimum focus on the information bearing surface.

45. A lens focusing system as defined in claim 44, wherein said prescribed ratio is substantially 1:1.

46. A lens focusing system as defined in claim 44, wherein said prescribed ratio is other than 1:1, and further including:
bias means, responsive to said source means, for altering said control means in response to variations in radiation power of said source beam, whereby said variations do not result in movement of said optical lens.

47. A lens focusing system as defined in claim 38, wherein said prescribed ratio is less than unity and wherein said control means includes compensation means for compensating for non-linear changes in said second electrical signal relative to changes in said first electrical signal.

48. A lens focusing system as defined in claim 38, wherein said photosensitive surface of said first detector is circular in shape.

49. A lens focusing system as defined in claim 48, wherein said photosensitive surface of said second detector is annular in shape.

50. A method of detecting focus in an optical system wherein a radiant beam is directed to a reflective surface to be focused thereon and a reflected beam, representing the reflection of the radiant beam from the reflective surface, is directed away from the surface, said method comprising of steps of:
focusing the reflected beam at an image plane remote from the reflective surface;
detecting the radiation received from the reflected beam over a first area non-coincidental with said image plane;
providing a first electrical signal indicative of the radiation received over said first area;
detecting the radiation received over a second area, disposed around the periphery of said first area;
providing a second electrical signal indicative of the radiation received over said second area; and
comparing said first signal with said second signal, whereby a detection of the focus condition of the radiant beam relative to the reflective surface is provided.

51. A method as defined in claim 50, wherein said first area and said second area are concentrically aligned on an axis defined by the path of the reflected beam.

52. A method as defined in claim 50, wherein said first area and said second area are substantially coplanar.

53. A method as defined in claim 50, wherein said first area is circular in shape.

54. A method as defined in claim 53, wherein said second area is annular in shape.

55. A method as defined in claim 54, wherein said first area and said second area are substantially coplanar.

56. A method as defined in claim 50, wherein the ratio of said second area to said first area is substantially 25:1 or more.

* * * * *